(12) United States Patent  
Nakanishi et al.

(10) Patent No.: US 7,055,291 B2
(45) Date of Patent: Jun. 6, 2006

(54) CLIP FOR SASH MOLDING OF VEHICLE DOOR

(75) Inventors: Hideaki Nakanishi, Toyohashi (JP); Takashi Yamanaka, Tokyo (JP); Hideaki Sugimoto, Tokyo (JP)

(73) Assignees: Newfrey LLC, Newark, DE (US); Sankei Giken Kogyo Co., Ltd., Tokyo (JP)

( * ) Notice: Subject to any disclaimer, the term of this patent is extended or adjusted under 35 U.S.C. 154(b) by 202 days.

(21) Appl. No.: 10/611,148

(22) Filed: Jul. 2, 2003

(65) Prior Publication Data

US 2004/0006923 A1    Jan. 15, 2004

(30) Foreign Application Priority Data

Jul. 4, 2002    (JP)    ............... 2002-195938

(51) Int. Cl.
  *B62D 39/00*    (2006.01)
(52) U.S. Cl. ................. 52/716.5; 52/718.06; 296/1.08; 49/377
(58) Field of Classification Search ................. 49/377, 49/502, 496.1; 296/146.9, 1.08; 52/716.5, 52/718.06, 718.03
  See application file for complete search history.

(56) References Cited

U.S. PATENT DOCUMENTS

| | | | | |
|---|---|---|---|---|
| 2,786,249 A | * | 3/1957 | Poupitch | 24/293 |
| 2,961,723 A | * | 11/1960 | Hamman | 24/289 |
| 3,680,903 A | * | 8/1972 | Hulten | 293/142 |
| 4,348,046 A | * | 9/1982 | Ohya | 296/201 |
| 4,421,802 A | * | 12/1983 | Mitsuoka et al. | 428/31 |
| 4,442,634 A | * | 4/1984 | Kimura | 49/493.1 |
| 4,463,539 A | * | 8/1984 | Simon | 52/716.5 |
| 4,508,382 A | * | 4/1985 | Tsumoto et al. | 296/213 |
| 4,830,898 A | * | 5/1989 | Smith | 428/122 |
| 4,860,494 A | * | 8/1989 | Fujii et al. | 49/493.1 |
| 4,911,349 A | * | 3/1990 | Miller | 224/326 |
| 5,186,509 A | * | 2/1993 | Tyves | 52/716.5 |
| 5,275,455 A | * | 1/1994 | Harney et al. | 296/1.08 |
| 5,433,038 A | * | 7/1995 | Dupuy | 49/377 |
| 5,519,968 A | * | 5/1996 | Dupuy | 49/489.1 |
| 5,671,565 A | * | 9/1997 | Furuse | 49/377 |
| 5,820,198 A | * | 10/1998 | Nozaki | 296/146.9 |
| 5,964,496 A | * | 10/1999 | Nozaki et al. | 296/146.9 |
| 6,416,113 B1 | * | 7/2002 | Page | 296/146.2 |
| 2002/0096912 A1 | * | 7/2002 | Page | 296/189 |

FOREIGN PATENT DOCUMENTS

| | | |
|---|---|---|
| JP | 3-51616 | 5/1991 |
| JP | 7-186724 | 7/1995 |
| JP | 8-300953 | 11/1996 |

* cited by examiner

*Primary Examiner*—Gregory J. Strimbu
(74) *Attorney, Agent, or Firm*—Miles & Stockbridge P.C.

(57) ABSTRACT

A clip for a sash molding comprises an elongated end cap adapted to be inserted into an end portion of the sash molding, a fastener adapted to be fixed to a door pillar, and a lip for filling a gap between the sash molding and the door pillar. The fastener and the end cap are made of hard plastic material, and are integrally molded to one another. The lip is made of soft plastic material, and is integrally connected to the end cap in a predetermined configuration, by pouring the soft plastic material in its molten state onto a predetermined region of the end cap and solidifying the soft plastic material thereon. The clip may also include a cover portion, made of a soft plastic material, that continuously extends from the lip and is integrally connected to an end of the end cap.

6 Claims, 6 Drawing Sheets

CLIP FOR SASH MOLDING OF VEHICLE DOOR

CROSS REFERENCE TO RELATED APPLICATION

This application claims the benefit of Japanese Application No. 2002-195938 filed Jul. 4, 2002, incorporated herein by reference.

BACKGROUND OF THE INVENTION

The present invention relates to a clip for fixing a sash molding to a door pillar of a vehicle such as an automobile, and more particularly to a clip having a lip for closing a gap between a sash molding and a door pillar.

It is well known to provide an automobile door with a frame extending along the upper edge thereof to receive a door glass, and a sash molding for covering the frame and an edge of the glass. In the example shown in FIG. 1, a sash molding 2 is disposed along the upper edge of a front door 1 to extend from the front side to the rear side of the upper edge of the door 1 in the moving direction of an automobile. A door pillar 6 for movably supporting a window glass 5 extends vertically toward a rear end portion 3 of the sash molding 2.

FIG. 2 is an enlarged view of a circled area II in FIG. 1. Section line III—III in FIG. 2 represents the location of several different sectional views to be described. As shown in FIG. 2, The sash molding 2 is disposed to cover the upper end of the door pillar 6 to provide a good appearance. A portion of the sash molding 2 including the end portion 3 is fixed to the door pillar 6 by a sash-molding clip 7 as shown in FIGS. 3A and 3B, which are sectional views taken along the line III—III in FIG. 2. The sash-molding clip 7 is inserted into a cavity in the end portion 3 of the sash molding 2 to close the cavity in order to provide a good appearance. The clip 7 includes a fastener (not shown) adapted to be fixed to the door pillar 6 to attach the sash molding 2 to the door pillar 6.

Although the sash-molding clip 7 shown in FIG. 3(A) is capable of fixing the sash molding 2 to the door pillar, a gap 9 is formed between the door pillar 6 and the lower edge of the sash molding 2, which detracts from the appearance and the sealing performance against rainwater or the like. For this reason, as shown in FIG. 3(B), a lip 10 made of a soft plastic material is bonded to the lower edge of the sash molding 2 opposed to the door pillar 6 in a length extending over the entire width of the door pillar 6, to close the gap 9 when the sash molding 2 is attached to the door pillar 6. While the lip 10 can be bonded to the sash molding 2 with adhesive, such an operation carried out in a mass production assembly line has poor productivity, and a certain level of skill is required to bond the lip 10 reliably and stably, resulting in increased cost.

Japanese Utility Model Laid-Open No. 03-51616 discloses a structure in which a protruded piece extending over the gap between a sash molding and a door pillar is formed in a glass run (a member for receiving the edge of a movable window glass) to serve as a gasket or packing. This structure is intended to form the glass run extending over a window frame in a specific configuration to close the gap. A sash-molding clip is not used to close the gap. Japanese Patent Laid-Open No. 07-186724 discloses an end cap adapted to be inserted into an end portion of a sash molding of an automobile door to close the end portion. This end cap includes a lock portion, and a pillar cover of a door pillar includes a hook for receiving the lock portion. When the end cap is inserted into the molding, the lock portion is positioned adjacent to the door pillar. Then, the hook of the pillar is engaged with the lock portion to maintain the pillar cover in position relative to the sash molding. There is no suggestion of a lip for closing a gap between the sash molding and the door pillar. Japanese Patent Laid-Open No. 08-300953 discloses a glass run structure for improving a sealing function and a function of guiding a window glass. This glass run structure is intended to provide a continuous appearance between front and rear doors, but there is no lip to close a gap between the sash molding and a door pillar, nor is there a sash-molding clip to close the gap.

BRIEF DESCRIPTION OF THE INVENTION

It is an object of the present invention to provide an improved structure including a clip, capable of fixing an end portion of a sash molding to a door pillar while closing a gap between the sash molding and the door pillar with a lip formed on the clip.

In an embodiment according to the present invention, there is provided a clip for a sash molding of an automobile door having an elongated end cap adapted to be inserted into a cavity in an end portion of the sash molding, a fastener adapted to be fixed to a portion of a door pillar extending to the sash molding, and a lip for filling a gap between the sash molding and the door pillar. The fastener and the end cap are made of hard plastic material and integrally molded with each other so that when the end cap is inserted into the sash molding, the fastener is positioned to be fixed to a predetermined region of the door pillar. The lip is made of soft plastic material and is integrally connected to the end cap in a predetermined configuration, by pouring the soft plastic material in its molten state onto a predetermined region of the end cap in a molding die and solidifying the soft plastic material.

Instead of bonding the lip to the sash molding 2 as in the prior art, the lip is connected to the end cap by a molding operation. Thus, the connection strength between the lip and the end cap can be maintained at high levels, and the clip can be formed through a molding process to allow the clip to be mass-produced while maintaining high quality. In addition, the gap between the sash molding and the door pillar can be closed without any skill, merely by inserting the end cap into the end portion of the sash molding and fixing the fastener to the door pillar.

In one embodiment, the above sash-molding clip may include a cover portion of a soft plastic material, which continuously extends from the lip and is integrally connected to an end of the end cap. According to this structure, an ornamental surface of the end cap and the lip can be seamlessly continued to provide an enhanced sealing function of the sash molding end portion and an excellent appearance of the entire end portion.

Preferably, the end cap is formed with a plurality of through-holes receiving the soft plastic material therein, and the soft plastic material received in the through-holes is formed as a plurality of anchors to reinforce the connection between the soft plastic material and the hard plastic material. Each of the through-holes may have an inlet and outlet for the soft plastic material, and the outlet is preferably formed to have a larger diameter than that of the inlet to prevent the anchors from escaping from the through-holes. According to this structure, the lip and the cover portion can be more firmly connected to the end cap.

In the above clip, the hard plastic material is preferably a polycarbonate-based polymer-alloy, and the soft plastic material is preferably a thermoplastic elastomer material (TPE) having high fused adhesion to the hard plastic material. Preferably, the soft plastic material is connected to the end cap along the length and the end of the end cap, and the connection edges of the length and the end of the end cap are formed to define an irregular or erose line to reinforce the connection between the soft plastic material and the hard plastic material. In the above clip, the fastener preferably has an anchor-leg shape protruding from the end cap to be inserted into and fixed to a mounting hole of the door pillar.

BRIEF DESCRIPTION OF THE DRAWINGS

The invention will be further described in conjunction with the accompanying drawings, which illustrate a preferred (best mode) embodiment, and wherein:

FIGS. 3A and 3B are sectional views taken along the line III—III in FIG. 2, showing the relationship between a conventional sash-molding clip and a sash molding, wherein FIG. 3A shows the state where a gap exists between the molding and a door pillar, and FIG. 3B shows the state after a lip for closing the gap is bonded to the sash molding.

DETAILED DESCRIPTION OF THE INVENTION

Figure 7:
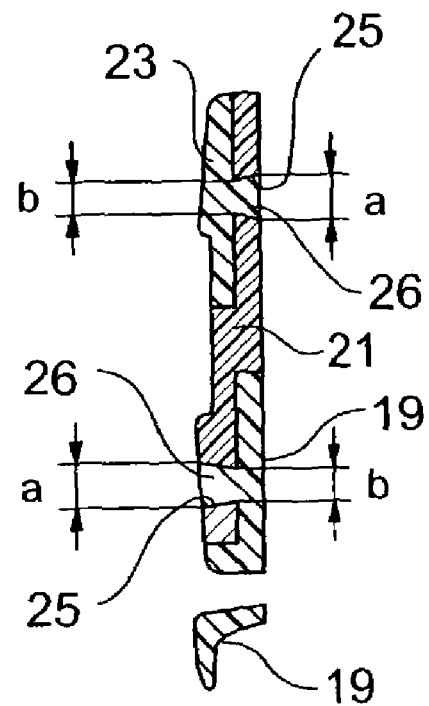
FIG. 7 is a sectional view of the clip, taken along the line VII—VII in FIG. 5.
Figure 8:
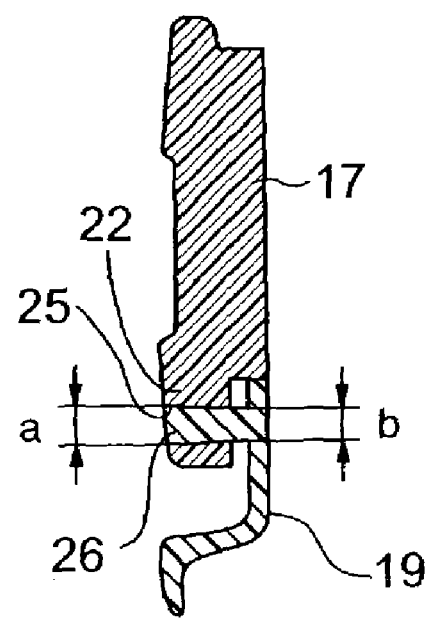
FIG. 8 is a sectional view of the clip, taken along the line VIII—VIII in FIG. 5.
Figure 9:
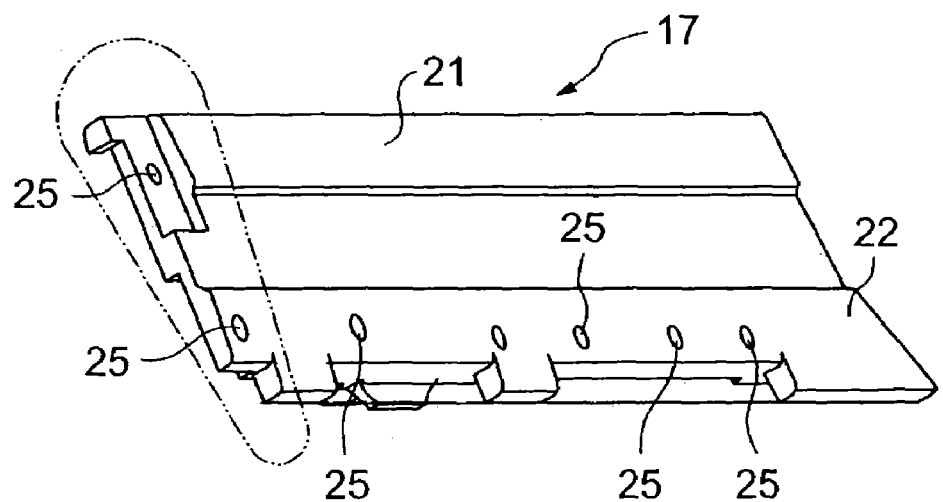
FIG. 9 is a top perspective view of an end cap of the clip in FIG. 4 before a lip and a cover portion are formed.
Figure 10:
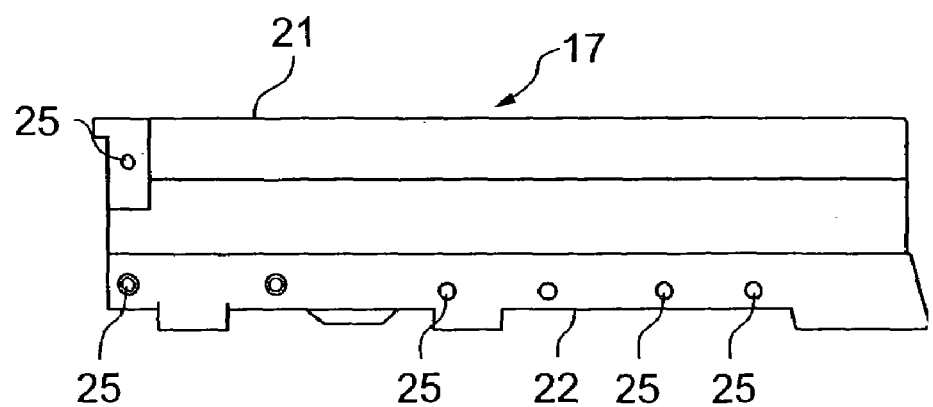
FIG. 10 is a top plan view of the end cap in FIG. 9.

FIGS. 4 to 8 show a sash-molding clip 15 according to one embodiment of the present invention, and FIGS. 9 and 10 show an end cap 17 of the clip 15 in the state before a lip is connected thereto. As shown in FIGS. 4 to 8, the sash-molding clip 15 of the present invention comprises an elongated end cap 17 adapted to be inserted into a cavity of an end portion of a sash molding (see end portion 3 of the sash molding 2 in FIG. 2), a fastener 18 (see FIG. 6) adapted to be fixed to a portion of a door pillar (see door pillar 6 in FIG. 2) extending to the sash molding, and a flexible lip 19 for filling a gap between the sash molding and the door pillar.

In the present embodiment, the fastener 18 and the end cap 17 are integrally molded from a hard plastic material. FIGS. 9 and 10 show the end cap 17 without showing the fastener 18. The end cap 17 includes a body portion 21 having dimensions capable of closing the end portion of the sash molding, and a lip support portion 22 extending in the longitudinal direction of the sash molding over a length covering the width of the door pillar (see the width 11 of the door pillar 6 in FIG. 2). The fastener 18 (FIG. 6) is fixed to the rear side of the end cap 17 shown in FIGS. 9 and 10 through an integral molding process. The hard plastic material includes, but is not limited to, a polycarbonate (PC)-based polymer-alloy, such as a PC/PBT alloy combined with polybutyrene terephtalate (PBT).

In the present embodiment, the lip 19 is made of a soft plastic material. The soft plastic material is preferably a thermoplastic elastomer material (TPE), particularly a polyester-base thermoplastic elastomer. This thermoplastic elastomer is advantageous in having high fused-adhesion to the aforementioned PC/PBT alloy. In a process for forming the lip 19, a molding die having a predetermined configuration extending over the width of the door pillar (see the width 11 in FIG. 2) to close the gap between the door pillar and the sash molding is arranged along the longitudinally extending edge of the body portion 21 and the lip support portion 22 of the end cap 17. The soft plastic material in its molten state is poured into the die and then solidified to form the lip 19 having a predetermined configuration. The lip 19 is fusion-bonded onto a predetermined region of the longitudinally extending edge of the end cap 17, and integrally connected to the end cap 17.

In one embodiment, the sash-molding clip 15 includes a cover portion 23 of the same soft plastic material as the lip 19, which continuously extends from the lip 19 and is integrally connected to an end of the body portion 21 of the end cap 17. Preferably, the molding die for forming the lip 19 has a configuration capable of forming the cover portion 23 which is integrally molded with the lip 19 simultaneously in a common molding process, so that the lip 19 and the cover portion 23 are integrally connected to one another. Thus, the lip 19 and a part of the cover portion 23 serving as an ornamental surface in the sash molding end portion closed by the end cap can be seamlessly continued to provide an enhanced sealing function of the sash molding end portion and an excellent appearance of the entire end portion.

Referring to FIGS. 9 and 10, the end cap 17 may be formed with a plurality of through-holes 25 for receiving the soft plastic material therein. In one embodiment, the plurality of through-holes 25 are formed along the longitudinally extending edge of the body portion 21 and the lip support portion 22 at predetermined intervals, and formed along the end edge of the body portion onto which the cover portion will be formed. In the process of forming the lip 19 and the cover portion 23, the soft plastic material flows in the through-holes 25, and forms a plurality of anchors after its solidification. These anchors allow the lip 19 and the cover portion 23 made of the soft plastic material to be connected to the end cap 17 made of the hard plastic material with an enhanced connection strength.

As shown in FIGS. 7 and 8, each of the through-holes 25 has an inlet for receiving the soft plastic material therethrough, and an outlet for the received soft plastic material, wherein the outlet has a larger diameter (a) than the diameter (b) of the inlet. This structure prevents the anchors 26 filling the through-holes 25 from escaping from the through-holes. Thus, the lip 19 and the cover portion 23 can be more firmly connected to the end cap 17.

Figure 5:
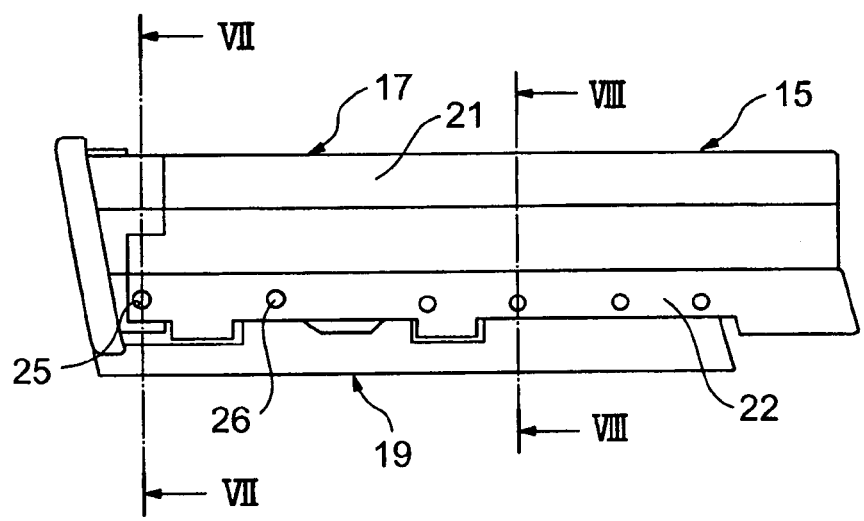
FIG. 5 is a top plan view of the sash-molding clip in FIG. 4.

Further, the longitudinal extending edge of the body portion 21 and the lip support portion 22 of the end cap 17 and the end edge of the body portion 21 are formed to define an irregular or erose line, as illustrated in FIGS. 5, 9 and 10. This structure allows the soft plastic material to be fusion-bonded to the hard plastic material of end cap 17 along the irregular line with an increased area, and to restrict movement of the soft plastic material in the longitudinal direction, so that the connection between the soft plastic material and the hard plastic material is reinforced.

Figure 6:
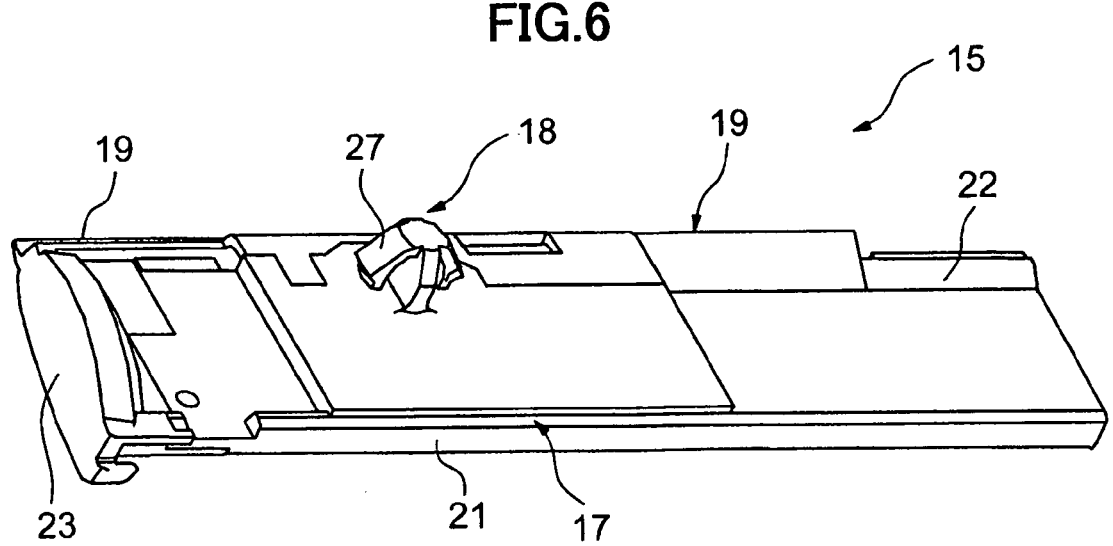
FIG. 6 is a bottom perspective view of the clip in FIG. 4.

In the embodiment shown in FIG. 6, the fastener 18 is integrally molded with the end cap 17 in such manner that when the end cap 17 is inserted into the sash molding, the fastener 18 is located at a position allowing the fastener 18 to be fixed to a predetermined region of the door pillar. The fastener 18 is formed in a shape suitable to be fixed to the door pillar. In the illustrated embodiment, the fastener is formed with an anchor-leg-shaped engagement portion 27 protruding from the end cap 17 to be inserted into and fixed to a mounting hole 29 (FIG. 12) of the door pillar. Any other suitable shape providing a function of fixing the clip 15 to the door pillar may be used. The door pillar to which the clip is fixed may include a pillar cover, so-called door skin.

Figure 1:
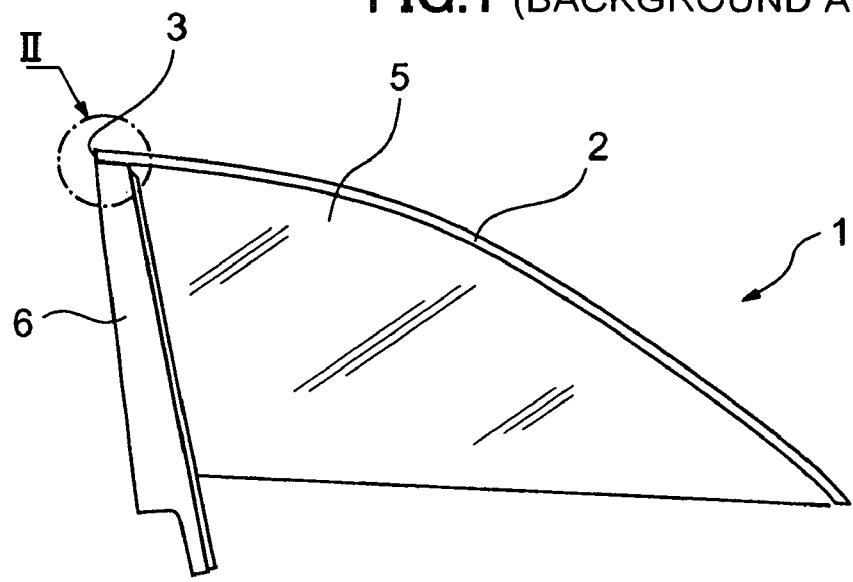
FIG. 1 is a front view showing a portion of a front door of a vehicle.
Figure 2:
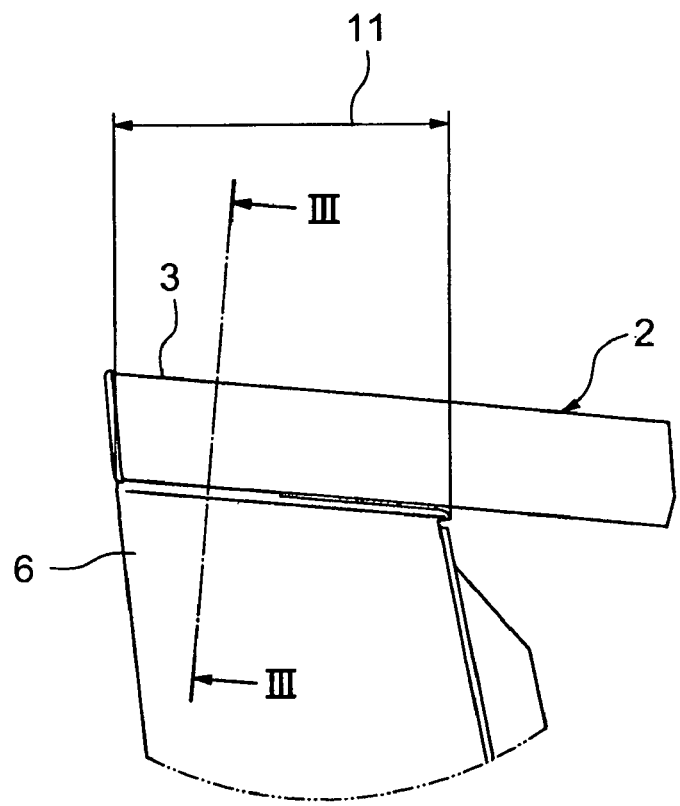
FIG. 2 is an enlarged view of the area surrounded by the circle II in FIG. 1.
Figure 3A:
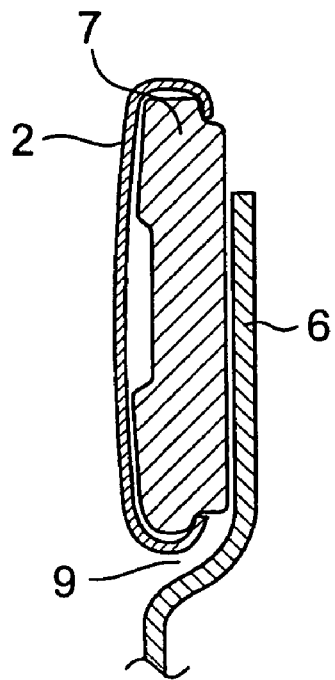
Figure 3B:
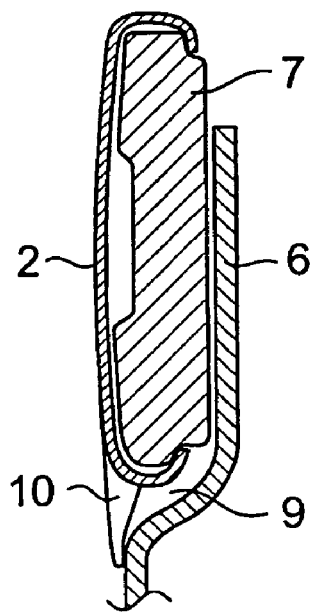
Figure 4:
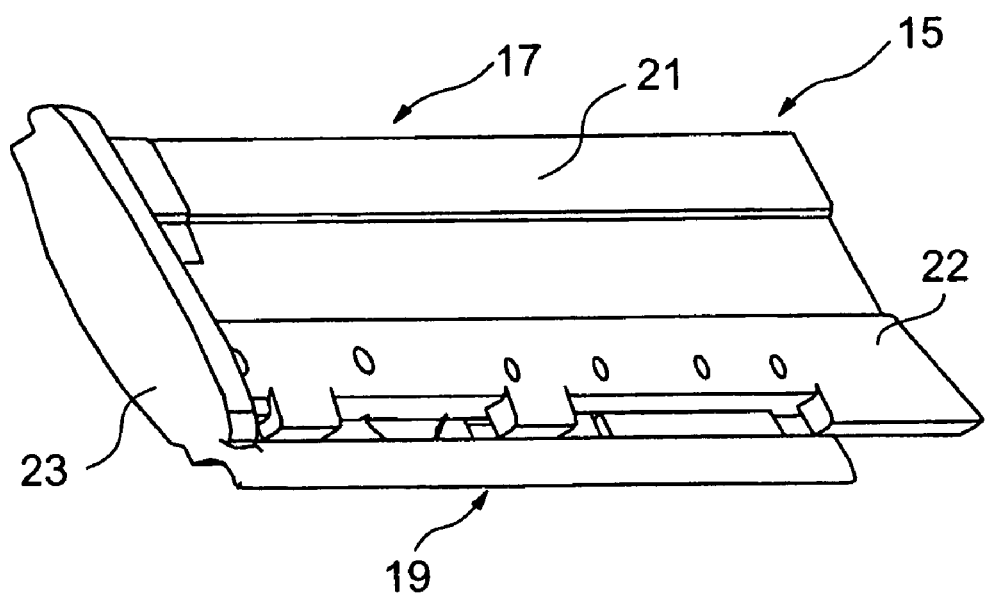
FIG. 4 is a top perspective view of a sash-molding clip according to one embodiment of the present invention.
Figure 11:
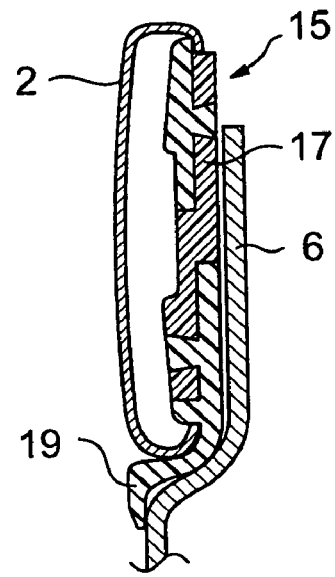
FIG. 11 shows the relationship between the sash-molding clip according to the present invention and a sash molding and is a sectional view taken along the line III—III in FIG. 2
Figure 12:
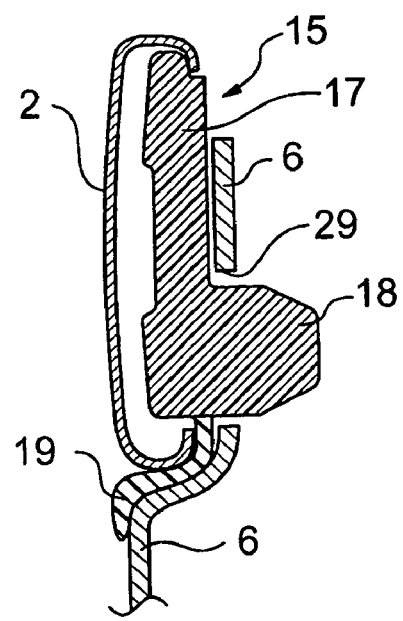
FIG. 12 is a sectional view showing a sash-molding clip in FIG. 11 including a fastener in the state after the fastener is fixed to a door pillar.

FIG. 11 is a cross-sectional view taken along the line III—III in FIG. 2, which shows the state after the sash molding 2 is fixed to the door pillar 6 by using the sash-molding clip 15 according to the present invention. In FIG. 11, the body portion of the end cap 17 of the clip 15 resides in the cavity of the sash molding. The lip 19 protrudes continuously from the lower edge of the end cap 17, and extends over the gap between the lower edge of the sash molding 2 and the door pillar 6. The lip 19, made of the soft plastic material, can be readily deformed along the configuration of the door pillar 6 or the sash molding 2 to close and tightly seal the gap. FIG. 12 shows the state after the fastener 18 is inserted into the mounting hole 29 of the door pillar 6 to fix the clip 15 to the door pillar 6 and consequently fix the sash molding to the door pillar 6.

Preferably, in the sash-molding clip of the present invention, the end cap and the fastener form a member integrally molded with plastic material substantially harder than the plastic material of the lip, and the lip is formed by pouring soft plastic material in its molten state onto the integrally molded member. Instead of bonding the lip to the sash molding as in the prior art, the lip is connected to the end cap through anchors and fusion-bonding. Thus, the connection strength between the lip and the end cap can be maintained at high levels, and the clip can be formed through a molding process to allow the clip to be produced in large quantities while maintaining high quality. In addition, the gap between the sash molding and the door pillar can be closed without any skill, merely by inserting the end cap into an end portion of the sash molding and fixing the fastener to the door pillar.

While a preferred embodiment of the invention has been shown and described, it will be apparent that changes can be made without departing from the principles and spirit of the invention, the scope of which is defined in the appended claims.

What is claimed is:

1. A clip for a sash molding at an upper edge of a window of a vehicle door comprising:

an elongated end cap adapted to be inserted into a cavity in an end portion of the sash molding;

a fastener adapted to be fixed to an upper portion of a door pillar extending to the sash molding; and a lip for filling a gap between the sash molding and the door pillar, wherein the fastener and the end cap are made of a first plastic material, and integrally molded with one another so that when the end cap is inserted into the sash molding, the fastener is positioned to be fixed to the upper portion of the door pillar, and a longitudinal axis of the lip extends generally parallel to a longitudinal axis of the elongated end cap and the lip extends downwardly from the end cap so that the lip is adapted to be disposed below the sash molding to engage the door pillar, the lip is made of a second plastic material softer than the first plastic material of the end cap and is integrally molded to the end cap in a predetermined configuration, wherein the end cap is formed with a plurality of through-holes the second plastic material is received in the through-holes and is molded thereto to form a plurality of anchors that reinforce the connection between the second plastic material of the first lip and the plastic material of the end cap.

2. The clip as defined in claim 1, wherein, to an end of the end cap, is integrally connected a cover portion of the second plastic material to extend continuously from the lip.

3. The clip as defined in claim 1, wherein each of the through-holes has an inlet and an outlet for the second plastic material, each outlet having a larger diameter than each inlet to prevent the anchors from escaping from the through-holes.

4. The clip as defined in claim 1, wherein the first plastic material of the end cap is a polycarbonate-based polymer-alloy, and the second plastic material is a thermoplastic elastomer material having a fused adhesion to the first plastic material.

5. The clip as defined in claim 1, wherein the second plastic material is connected to the end cap along a connection edge of the end cap defining an irregular line to reinforce the connection between the second plastic material and the first plastic material of the end cap.

6. The clip as defined in claim 1, wherein the fastener protrudes from the end cap and is adapted to be inserted into and fixed to a mounting hole of the door pillar.

\* \* \* \* \*